(12) United States Patent
Choi et al.

(10) Patent No.: US 11,407,448 B2
(45) Date of Patent: Aug. 9, 2022

(54) VEHICLE FLOOR STRUCTURE

(71) Applicants: HYUNDAI MOTOR COMPANY, Seoul (KR); KIA MOTORS CORPORATION, Seoul (KR)

(72) Inventors: Ji Ho Choi, Hwaseong-si (KR); Seung Min Kang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 127 days.

(21) Appl. No.: 17/080,019

(22) Filed: Oct. 26, 2020

(65) Prior Publication Data

US 2021/0387672 A1 Dec. 16, 2021

(30) Foreign Application Priority Data

Jun. 15, 2020 (KR) .................. 10-2020-0072557

(51) Int. Cl.
*B60J 7/00* (2006.01)
*B62D 21/03* (2006.01)
*B60K 1/04* (2019.01)
*B60N 2/005* (2006.01)
*B62D 25/20* (2006.01)
*B60N 2/07* (2006.01)

(52) U.S. Cl.
CPC ............. *B62D 21/03* (2013.01); *B60K 1/04* (2013.01); *B60N 2/005* (2013.01); *B62D 25/2036* (2013.01); *B60K 2001/0438* (2013.01); *B60N 2/0702* (2013.01)

(58) Field of Classification Search
CPC .... Y02E 60/10; Y02E 60/50; H04W 72/0446; H04W 72/1289; H04L 5/0053; H01M 10/0525; A61P 43/00; C07D 213/26; C07D 409/12
See application file for complete search history.

(56) References Cited

U.S. PATENT DOCUMENTS

| | | | |
|---|---|---|---|
| 2007/0238016 A1* | 10/2007 | Takamatsu .......... | H01M 50/224 429/152 |
| 2017/0210217 A1* | 7/2017 | Kim ...................... | B62D 43/10 |
| 2017/0210218 A1* | 7/2017 | Schmalzrieth ........ | F16F 15/023 |
| 2019/0275873 A1* | 9/2019 | Kasai .................... | B60K 1/04 |
| 2019/0275876 A1* | 9/2019 | Fukui ................... | B62D 25/082 |
| 2021/0178883 A1* | 6/2021 | Kang ..................... | B60K 1/04 |
| 2021/0179181 A1* | 6/2021 | Choi ...................... | B60K 1/04 |
| 2021/0387550 A1* | 12/2021 | Lee ........................ | B60L 50/66 |
| 2022/0016966 A1* | 1/2022 | Kecalevic ............. | B62D 25/025 |
| 2022/0017152 A1* | 1/2022 | Kecalevic ............. | B62D 25/025 |
| 2022/0081040 A1* | 3/2022 | Choi ...................... | B62D 25/20 |

* cited by examiner

*Primary Examiner* — Kiran B Patel
(74) *Attorney, Agent, or Firm* — Morgan, Lewis & Bockius LLP (57) ABSTRACT

A vehicle floor structure includes: a center floor; a plurality of longitudinal members attached to a bottom surface of the center floor; and a battery assembly having a battery case disposed under the center floor and a through bolt passing through the battery case, wherein the through bolt is vertically aligned with respect to at least one longitudinal member among the plurality of longitudinal members, and the through bolt is joined to the at least one longitudinal member.

15 Claims, 9 Drawing Sheets

VEHICLE FLOOR STRUCTURE

CROSS-REFERENCE TO RELATED APPLICATION

This application is based on and claims the benefit of priority to Korean Patent Application No. 10-2020-0072557, filed on Jun. 15, 2020, in the Korean Intellectual Property Office, the disclosure of which is incorporated herein in its entirety by reference.

TECHNICAL FIELD

The present disclosure relates to a vehicle floor structure, and more particularly, to a vehicle floor structure capable of facilitating assembly of long seat rails, improving mount stiffness of a battery assembly, securing enough space for a passenger compartment and a desired battery capacity, and improving stiffness of a vehicle body.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is equipped with a battery assembly which is mounted to a vehicle body. The battery assembly includes one or more battery cells (or battery modules), electric/electronic components associated with the battery cells, and a battery case in which the battery cells and the electric/electronic components are mounted. The battery case is made up of an upper case and a lower case. The battery assembly may be mounted under a floor of the vehicle body.

In order to secure a larger passenger compartment and improve the interior design, research and development are being conducted to apply a flat floor, hidden seat rails, etc. to electric vehicles. However, a conventional electric vehicle has a relatively high floor height for the installation of the battery assembly compared to an internal combustion engine vehicle. As a result, the height of a carpet covering the floor, seat crossmembers, and the seat rails and the total height of the vehicle may be increased.

In addition, the electric vehicle is equipped with the high voltage battery assembly over the entirety of the floor to improve its driving range. In order to achieve the desired capacity of the battery assembly and enough space in the passenger compartment, reinforcing members extending along a longitudinal direction of the vehicle may not be mounted on a top floor surface of the conventional electric vehicle. The absence of the reinforcing members in the conventional electric vehicle reduces a load path and degrades crashworthiness and vehicle body stiffness, compared to the internal combustion engine vehicle.

In addition, a conventional vehicle seat assembly includes a vehicle seat, a support frame supporting the vehicle seat, and seat rails guiding the sliding of the support frame. The support frame may have a plurality of rollers, and the plurality of rollers may be guided along the seat rails. The conventional vehicle seat assembly is loaded and assembled along a lateral direction of the vehicle through each side door aperture of the vehicle. In recent years, long seat rails extending from a front seat to a rear seat has been applied in order to improve the qualities of vehicle seats and interior design. However, the long seat rails cannot be loaded through the side door aperture, making the assembly process very cumbersome and increasing the man-hour.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle floor structure capable of facilitating assembly of long seat rails, improving mount stiffness of a battery assembly, securing enough space for a passenger compartment and a desired battery capacity, and improving stiffness of a vehicle body.

According to an aspect of the present disclosure, a vehicle floor structure may include: a center floor; a plurality of longitudinal members attached to a bottom surface of the center floor; and a battery assembly having a battery case disposed under the center floor and a through bolt passing through the battery case. The through bolt may be aligned with respect to at least one longitudinal member among the plurality of longitudinal members, and the through bolt may be joined to the at least one longitudinal member.

The plurality of longitudinal members may include: two first longitudinal members facing each other in relation to a central longitudinal axis of the center floor; and two second longitudinal members disposed on both side edges of the center floor, respectively.

Each of the first longitudinal members may include a bottom wall having an inner side edge facing an interior of a vehicle and an outer side edge facing an exterior of the vehicle, an inner sidewall extending from the inner side edge of the bottom wall toward the center floor, an outer sidewall extending from the outer side edge of the bottom wall toward the center floor, an inner flange extending from a top end of the inner sidewall toward the interior of the vehicle, and an outer flange extending from a top end of the outer sidewall toward the exterior of the vehicle, and the inner flange and the outer flange may be joined to the bottom surface of the center floor.

Front ends of the first longitudinal members may be joined to front side members, rear ends of the first longitudinal members may be joined to a rear floor, and the rear floor may be disposed behind the center floor.

A pair of side sills may be attached to both side edges of the center floor, respectively, and the second longitudinal members may be joined to the corresponding side sills, respectively.

Each of the second longitudinal members may include a bottom wall, an inner sidewall extending from an inner side edge of the bottom wall toward the center floor, an inner flange extending from a top end of the inner sidewall toward an interior of a vehicle, and an outer flange extending vertically from an outer side edge of the bottom wall toward the battery assembly. The inner flange may be joined to the bottom surface of the center floor, and the outer flange may be joined to a corresponding side sill.

Front ends of the second longitudinal members may be joined to front side members, rear ends of the second longitudinal members may be joined to rear side members, and the rear side members may be disposed behind the center floor.

The vehicle floor structure may further include a plurality of long seat rails disposed in cavities of the plurality of longitudinal members, respectively. The through bolt may be vertically aligned with respect to at least one longitudinal member among the plurality of longitudinal members and at least one long seat rail among the plurality of long seat rails.

The long seat rail may have a guide portion guiding a roller of a vehicle seat assembly.

The vehicle floor structure may further include a reinforcing member received in the cavities of the longitudinal members. The reinforcing member may be located under the long seat rail, a nut may be fixed to the reinforcing member, and the through bolt may be screwed into the nut.

The center floor may have a first opening for mounting a roller of a vehicle seat assembly, and a second opening for guiding a movement of a seat support frame of the vehicle seat assembly, and a width of the second opening may be less than a width of the first opening.

The long seat rail may include a guide portion guiding a roller of a vehicle seat assembly, and a reinforcing portion integrally connected to the guide portion. The reinforcing portion may have a plurality of reinforcing ribs, a nut may be fixed to the reinforcing portion, and the through bolt may be screwed into the nut.

The vehicle floor structure may further include a plurality of crossmembers perpendicular to the plurality of longitudinal members, and the plurality of crossmembers may guide a roller of a vehicle seat assembly in a width direction of the vehicle.

The through bolt may be vertically aligned with respect to the at least one longitudinal member among the plurality of longitudinal members and with respect to the center floor.

The through bolt may pass through the at least one longitudinal member.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
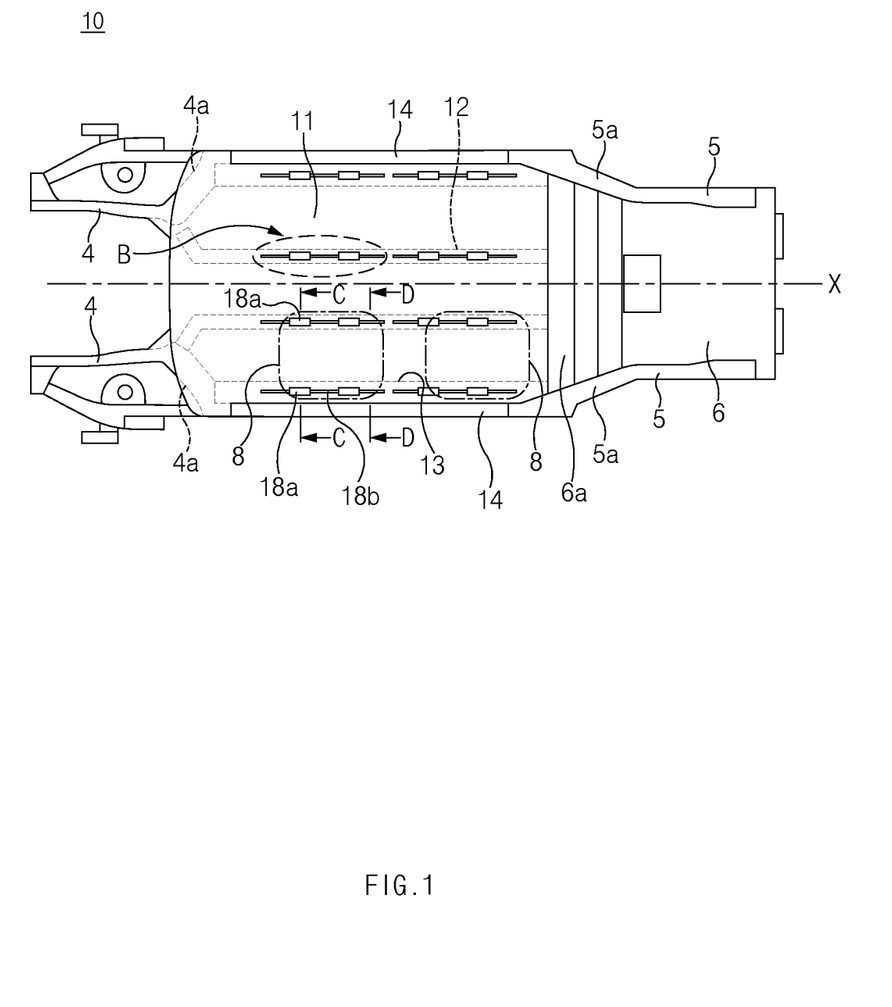
FIG. 1 illustrates a plan view of a vehicle floor structure according to an exemplary embodiment of the present disclosure.
Figure 2:
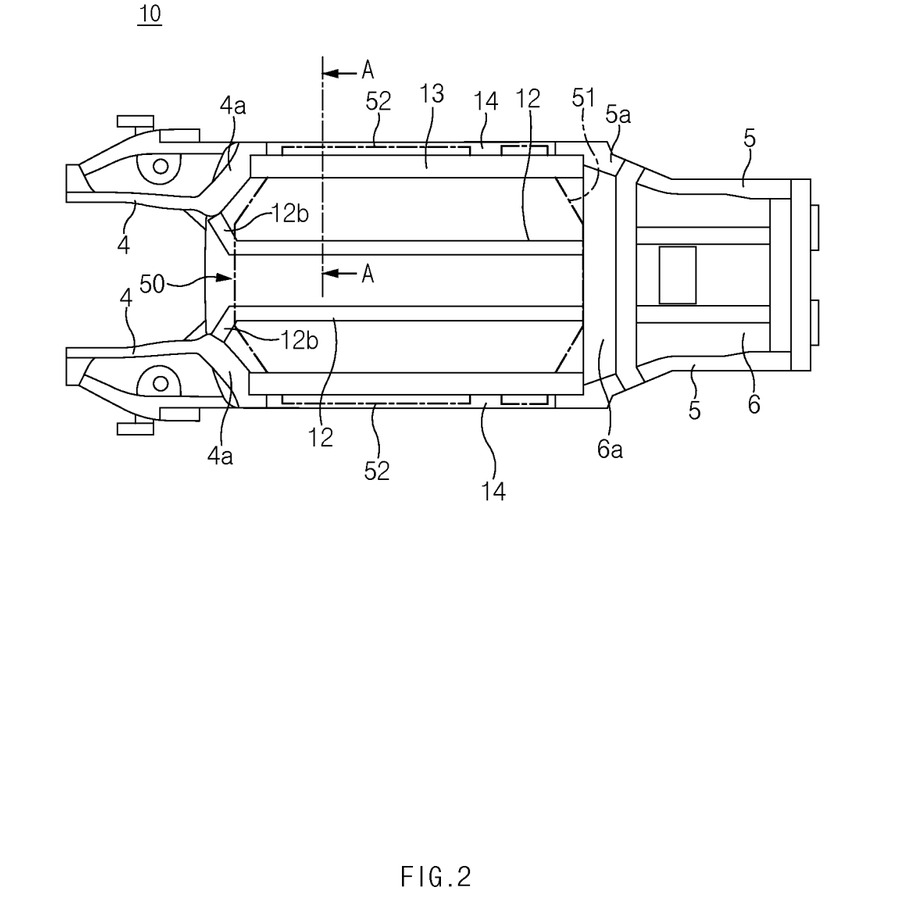
FIG. 2 illustrates a bottom view of a vehicle floor structure according to an exemplary embodiment of the present disclosure.

Referring to FIGS. 1 and 2, a vehicle floor structure according to an exemplary embodiment of the present disclosure may include a center floor 11 disposed on the bottom of a vehicle body, a plurality of longitudinal members 12 and 13 attached to a bottom surface of the center floor 11, a plurality of long seat rails 15 (shown in FIG. 4) inserted into the plurality of longitudinal members 12 and 13, respectively, and a battery assembly 50 (show in FIG. 3) disposed under the center floor 11.

A pair of side sills 14 may be attached to both side edges of the center floor 11, respectively, and thus the pair of side sills 14 may be spaced apart from each other in a width direction of the center floor 11. Each side sill 14 may extend in a longitudinal direction of the vehicle.

A pair of front side members 4 may be disposed in front of the center floor 11, and each front side member 4 may have an extension 4a extending obliquely toward a front end of the corresponding side sill 14. A pair of rear side members 5 may be disposed behind the center floor 11, and each rear side member 5 may have an extension 5a extending obliquely toward a rear end of the corresponding side sill 14. The front end of the side sill 14 may be joined to the extension 4a of the corresponding front side member 4, and the rear end of the side sill 14 may be joined to the extension 5a of the corresponding rear side member 5. A rear floor 6 may be disposed behind the center floor 11, and the rear floor 6 may be located between the pair of rear side members 5. The pair of rear side members 5 may be joined to both side edges of the rear floor 6, respectively.

A plurality of vehicle seat assemblies 8 may be mounted along the plurality of long seat rails 15, and the sliding of each vehicle seat assembly 8 may be guided by the plurality of long seat rails 15. The vehicle seat assembly 8 may include a vehicle seat 8a (shown in FIG. 3), a seat support frame 8b (shown in FIG. 3) supporting the vehicle seat 8a, and rollers 8c (shown in FIG. 3) rotatably mounted to the seat support frame 8b through shafts 8d (shown in FIG. 3).

The plurality of vehicle seat assemblies 8 may be disposed on the front and rear of the vehicle.

Each of the longitudinal members 12 and 13 may extend in the longitudinal direction of the vehicle to connect a vehicle front structure and a vehicle rear structure, and thus each of the longitudinal members 12 and 13 may define a load path parallel to a longitudinal axis of the vehicle. The vehicle front structure may be a structure disposed in front of the center floor 11, and the vehicle front structure may include a dash panel, the front side members 4, and the like. The vehicle rear structure may be a structure disposed behind the center floor 11, and the vehicle rear structure may include the rear floor 6, the rear side members 5, and the like. A front end of each of the longitudinal members 12 and 13 may be directly joined to the corresponding front side member 4 disposed under the dash panel of the vehicle front structure, and a rear end of each of the longitudinal members 12 and 13 may be directly joined to the rear floor 6 and the corresponding rear side member 5 of the vehicle rear structure.

The plurality of longitudinal members 12 and 13 may be attached to the bottom surface of the center floor 11 by welding, using fasteners, and/or the like. The plurality of longitudinal members 12 and 13 may be spaced apart from each other in a width direction of the vehicle, and each of the longitudinal members 12 and 13 may extend in the longitudinal direction of the vehicle.

Referring to FIGS. 1 and 2, the plurality of longitudinal members 12 and 13 may include two first longitudinal members 12 adjacent to a central longitudinal axis X of the center floor 11, and two second longitudinal members disposed on both side edges of the center floor 11, respectively. According to an exemplary embodiment, as illustrated in FIGS. 1 and 2, the two first longitudinal members 12 may face each other in relation to the central longitudinal axis X of the center floor 11, and the two second longitudinal members 13 may be joined to the two side sills 14 by welding, using fasteners, and/or the like, respectively.

Referring to FIGS. 1 and 2, each first longitudinal member 12 may extend in the longitudinal direction of the vehicle to connect the front side member 4 of the vehicle front structure and the rear floor 6 of the vehicle rear structure. The first longitudinal member 12 may have a front extension portion 12b extending from the front end thereof to the extension 4a of the front side member 4. The front extension portion 12b of the first longitudinal member 12 may be joined to the extension 4a of the front side member 4 by welding, using fasteners, and/or the like. A rear crossmember 6a or a kick up portion extending in the width direction of the vehicle may be disposed on the front of the rear floor 6, and the rear end of the first longitudinal member 12 may be joined to the rear crossmember 6a or the kick up portion of the rear floor 6 by welding, using fasteners, and/or the like. The first longitudinal members 12 may connect the front side members 4 of the vehicle front structure and the rear floor 6 of the vehicle rear structure in the longitudinal direction of the vehicle so that the first longitudinal members 12 may define load paths in the longitudinal direction of the vehicle. The plurality of load paths defined by the plurality of first longitudinal members 12 may be additionally provided with respect to the center floor 11, and thus impact energy may be distributed or absorbed through the plurality of load paths defined by the plurality of first longitudinal members 12.

Figure 3:
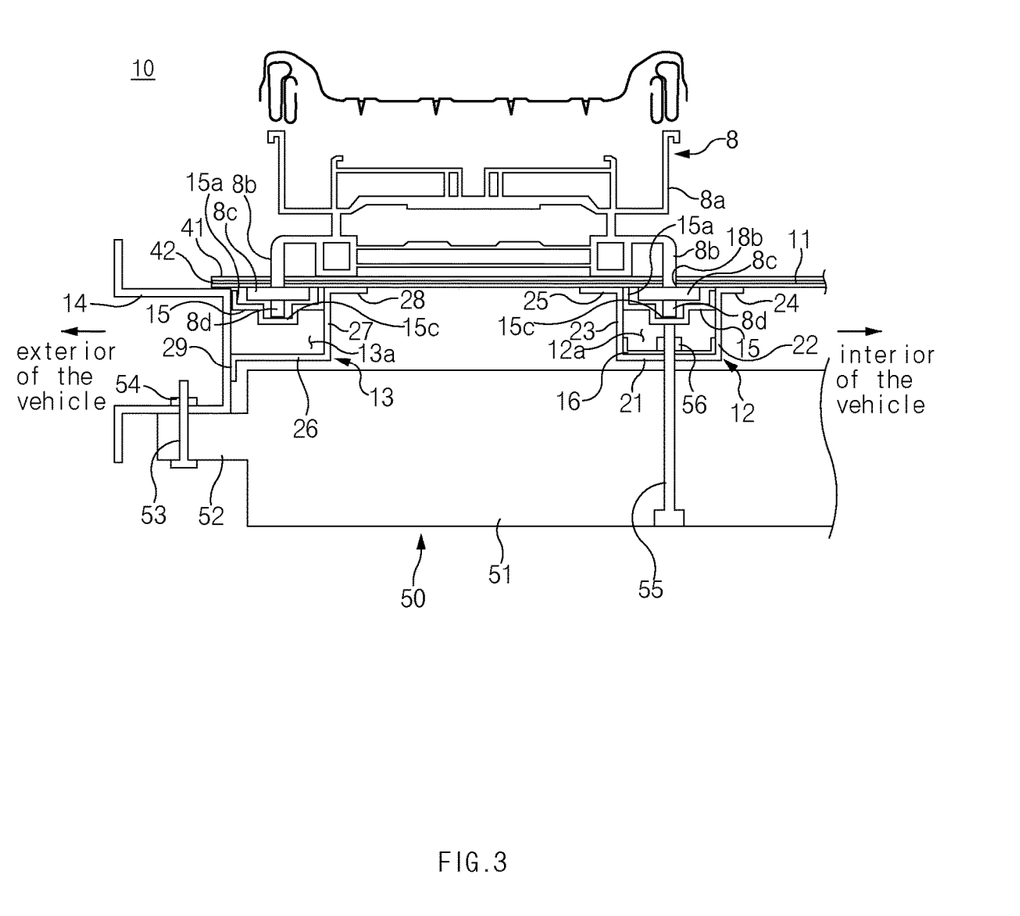
FIG. 3 illustrates a cross-sectional view taken along line A-A of FIG. 2.

Referring to FIG. 3, the first longitudinal member 12 may include a bottom wall 21 having an inner side edge facing the interior of the vehicle and an outer side edge facing the exterior of the vehicle, an inner sidewall 22 extending from the inner side edge of the bottom wall 21 toward the center floor 11, an outer sidewall 23 extending from the outer side edge of the bottom wall 21 toward the center floor 11, an inner flange 24 extending from a top end of the inner sidewall 22 toward the interior of the vehicle (in particular, the central longitudinal axis X of the vehicle), and an outer flange 25 extending from a top end of the outer sidewall 23 toward the exterior of the vehicle. The inner flange 24 and the outer flange 25 may be joined to the bottom surface of the center floor 11 by welding, using fasteners, and/or the like, and the first longitudinal member 12 may have a cavity 12a defined by the bottom wall 21, the inner sidewall 22, and the outer sidewall 23.

Referring to FIGS. 1 and 2, each second longitudinal member 13 may extend in the longitudinal direction of the vehicle to connect the front side member 4 of the vehicle front structure and the rear side member 5 of the vehicle rear structure. The front end of the second longitudinal member 13 may be joined to the extension 4a of the front side member 4 by welding, using fasteners, and/or the like, and the rear end of the second longitudinal member 13 may be joined to the extension 5a of the rear side member 5 by welding, using fasteners, and/or the like. The second longitudinal members 13 may connect the front side members 4 of the vehicle front structure and the rear side members 5 of the vehicle rear structure in the longitudinal direction of the vehicle so that the second longitudinal members 13 may define load paths in the longitudinal direction of the vehicle. The plurality of load paths defined by the plurality of second longitudinal members 13 may be additionally provided with respect to the center floor 11, and thus impact energy may be distributed or absorbed through the plurality of load paths defined by the plurality of second longitudinal members 13.

Referring to FIG. 3, the second longitudinal member 13 may include a bottom wall 26, an inner sidewall 27 extending from an inner side edge of the bottom wall 26 toward the center floor 11, an inner flange 28 extending from a top end of the inner sidewall 27 toward the interior of the vehicle (in particular, the central longitudinal axis X of the vehicle), and an outer flange 29 extending vertically from an outer side edge of the bottom wall 26 toward the battery assembly 50. The inner flange 28 may be joined to the bottom surface of the center floor 11 by welding, using fasteners, and/or the like, and the outer flange 29 may be joined to the side sill 14 by welding, using fasteners, and/or the like. The second longitudinal member 13 may have a cavity 13a defined by the bottom wall 26 and the inner sidewall 27.

Each long seat rail 15 may extend in the longitudinal direction of the vehicle, and the long seat rail 15 may extend from the front of the center floor 11 toward the rear of the center floor 11. The long seat rail 15 may have a length capable of receiving slide paths of a front vehicle seat assembly and a rear vehicle seat assembly. The long seat rails may guide the sliding (movement) of each vehicle seat assembly 8. The long seat rails 15 may be received in the corresponding cavities 12a and 13a of the longitudinal members 12 and 13, respectively, and the long seat rails 15 may be joined to inner surfaces of the corresponding longitudinal members 12 and 13 by welding, using fasteners, and/or the like. Each long seat rail 15 may have a guide portion 15a guiding the rollers 8c of the vehicle seat assembly 8, and the guide portion 15a may have a shape corresponding to an exterior surface of the roller 8c. The guide portion 15a may have a recess 15c in which a bottom end of the shaft 8d of the vehicle seat assembly 8 is received.

The vehicle floor structure 10 according to an exemplary embodiment of the present disclosure may further include reinforcing members 16 which are received and fixed in all of the cavities 12a and 13a of the longitudinal members 12 and 13 or at least some of the cavities 12a and 13a of the longitudinal members 12 and 13. The reinforcing members 16 may be located under the long seat rails 15 within the cavities 12a and 13a of the longitudinal members 12 and 13. In particular, the reinforcing members 16 may be fixed to the bottom walls of the longitudinal members 12 and 13.

Figure 4:
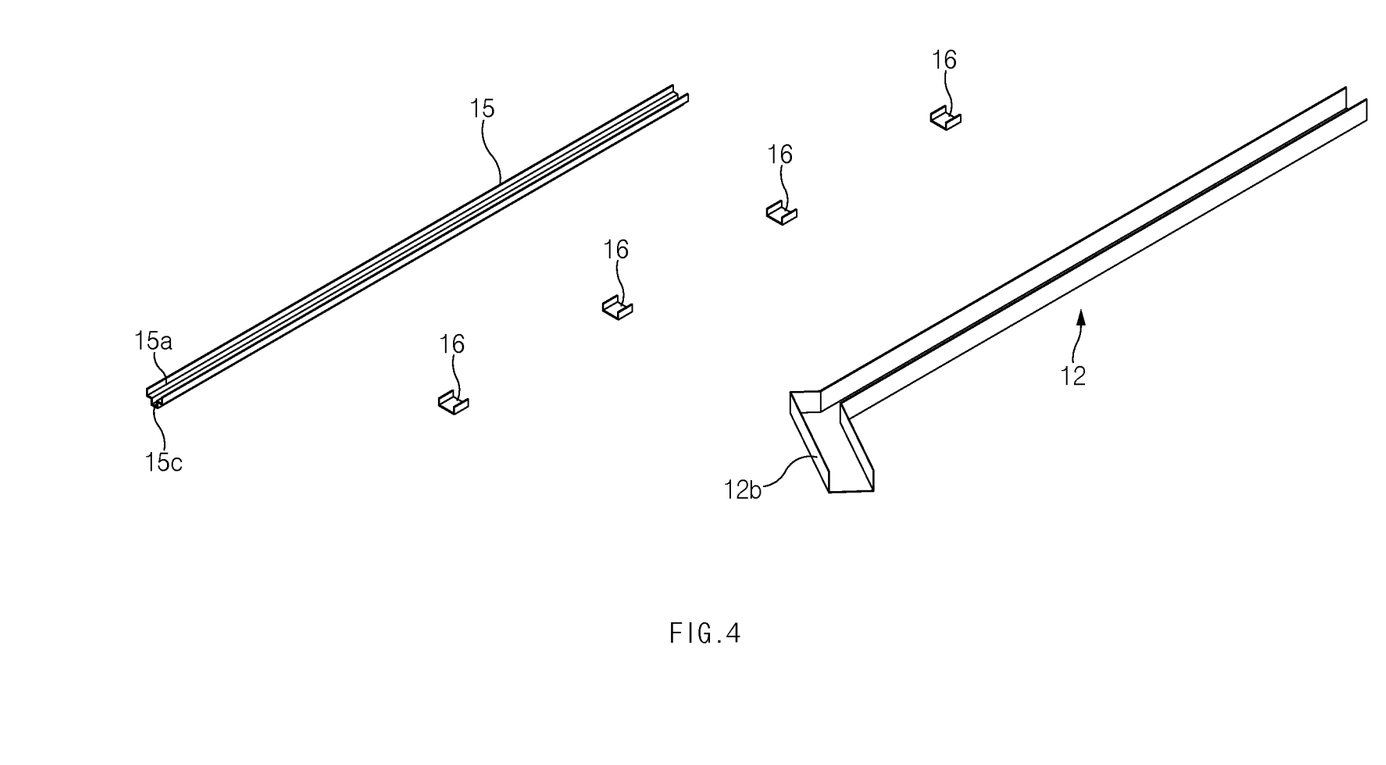
FIG. 4 illustrates an exploded perspective view of a first longitudinal member, a seat rail, and a plurality of reinforcing members illustrated in FIG. 3.
Figure 5:
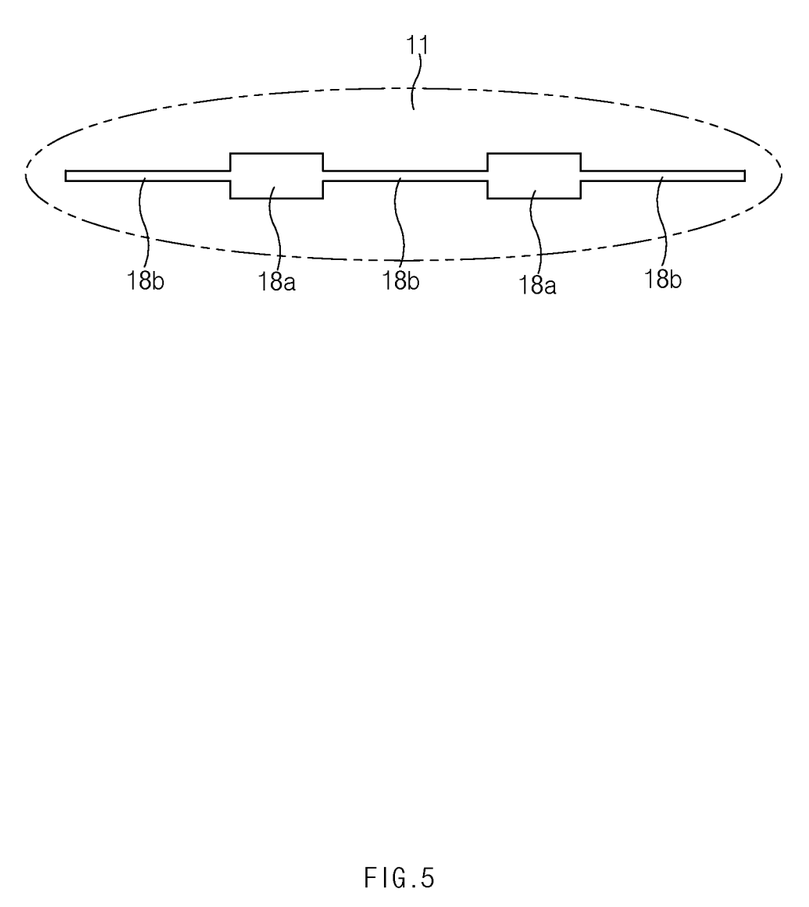
FIG. 5 illustrates an enlarged view of a portion indicated by arrow B of FIG. 1.

According to an exemplary embodiment, as illustrated in FIGS. 3 and 4, the plurality of reinforcing members 16 may be received and fixed in the cavity 12a of the first longitudinal member 12. In particular, the plurality of reinforcing members 16 may be fixed to the bottom wall 21 of the first longitudinal member 12 by welding, using fasteners, and/or the like, and the plurality of reinforcing members 16 may be spaced equidistant apart from each other in a longitudinal direction of the first longitudinal member 12. Thus, stiffness of the first longitudinal member 12 may be increased by the plurality of reinforcing members 16.

The battery assembly 50 may include a plurality of battery modules (not shown), and a battery case 51 in which the battery modules are received. The battery case 51 may be disposed under the center floor 11. The battery case 51 may have side mounts 52, and each side mount 52 may be mounted to the corresponding side sill 14 using a side mounting bolt 53 and a nut 54.

Through bolts 55 passing through the battery case 51 may be aligned with the first longitudinal member 12. The plurality of through bolts 55 may be joined to the plurality of first longitudinal members 12 so that the battery case 51 may be mounted to the plurality of first longitudinal members 12. Specifically, as a nut 56 is fixed to a top surface of the reinforcing member 16 received in the first longitudinal member 12, the through bolt 55 passes through the battery case 51, the bottom wall 21 of the first longitudinal member 12, and the reinforcing member 16, and a threaded portion of the through bolt 55 is screwed into the nut 56, the battery case 51 may be mounted to the first longitudinal member 12. The number and positions of the reinforcing members 16 may correspond to those of the through bolts 55, and thus each through bolt 55 may be joined to the corresponding reinforcing member 16. The reinforcing members 16 together with the through bolts 55 and the nuts 56 may form a mounting mechanism with respect to the battery assembly 50. In particular, as the reinforcing members 16 support the nuts 56, mount stiffness of the battery assembly 50 may be improved.

Referring to FIG. 3, the first longitudinal member 12, the long seat rail 15, the roller 8c of the vehicle seat assembly 8, and the through bolt 55 may be vertically aligned. In particular, a vertical axis of the first longitudinal member 12, a vertical axis of the long seat rail 15, a vertical axis of the roller 8c, and a vertical axis of the through bolt 55 may coincide. Thus, the battery case 51 of the battery assembly 50 may be firmly mounted to the first longitudinal member 12.

According to another exemplary embodiment, the plurality of reinforcing members 16 may be received and fixed in the cavities 12a of the first longitudinal members 12 and the cavities 13a of the second longitudinal members 13. That is, the plurality of reinforcing members 16 may be received and fixed in all of the cavities 12a and 13a of the longitudinal members 12 and 13. As the through bolts 55 are joined to the reinforcing members 16 and the nuts 56, the battery case 51 may be mounted (connected) to the plurality of first longitudinal members 12 and the plurality of second longitudinal members 13 through the plurality of through bolts 55. The longitudinal members 12 and 13, the long seat rails 15, the rollers 8c of the vehicle seat assembly 8, and the through bolts 55 may be vertically aligned. In particular, the vertical axis of each of the longitudinal members 12 and 13, the vertical axis of the long seat rail 15, the vertical axis of the roller 8c, and the vertical axis of the through bolt 55 may coincide. Thus, the battery case 51 of the battery assembly 50 may be firmly mounted to the first and second longitudinal members 12 and 13.

Referring to FIGS. 3 and 4, the plurality of reinforcing members 16 may be spaced apart from each other in the longitudinal direction of the longitudinal members 12 and 13, but are not limited thereto. Alternatively, the reinforcing member 16 may be an elongated extension member extending in the longitudinal direction of the longitudinal members 12 and 13. That is, a single reinforcing member may be received and fixed in the cavities 12a and 13a of the longitudinal members 12 and 13.

Referring to FIGS. 1 and 5 to 7, the center floor 11 may include a plurality of first openings 18a for the mounting of the rollers 8c of the vehicle seat assembly 8, and a plurality of second openings 18b for guiding the movement of the seat support frame 8b of the vehicle seat assembly 8. A width of the first opening 18a may be slightly greater than a width of the roller 8c of the vehicle seat assembly 8, and thus the roller 8c of the vehicle seat assembly 8 may be inserted and mounted to the long seat rail 15 through the first opening 18a. The second opening 18b may extend from the first opening 18a in the longitudinal direction of the vehicle, and a width of the second opening 18b may be less than the width of the first opening 18a. The width of the second opening 18b may be slightly greater than a width of the seat support frame 8b of the vehicle seat assembly 8. When the vehicle seat assembly 8 slides along the long seat rails 15, the seat support frame 8b may be guided through the second openings 18b. The first opening 18a may have a length capable of receiving the roller 8c of the vehicle seat assembly 8, and a length of the second opening 18b may be greater than the length of the first opening 18a so that the second opening 18b may guide the movement of the seat support frame 8b of the vehicle seat assembly 8. That is, the length of the first opening 18a may be less than the length of the second opening 18b.

Since the width and length of the first opening 18a correspond to those of the roller 8c of the vehicle seat assembly 8, the mounting of the vehicle seat assembly 8 may be facilitated. Since the width of the second opening 18b is less than the width of the first opening 18a, the widths of the openings 18a and 18b in the center floor 11 may be minimized, and thus watertight and NVH performance of the center floor 11 may be improved.

Figure 6:
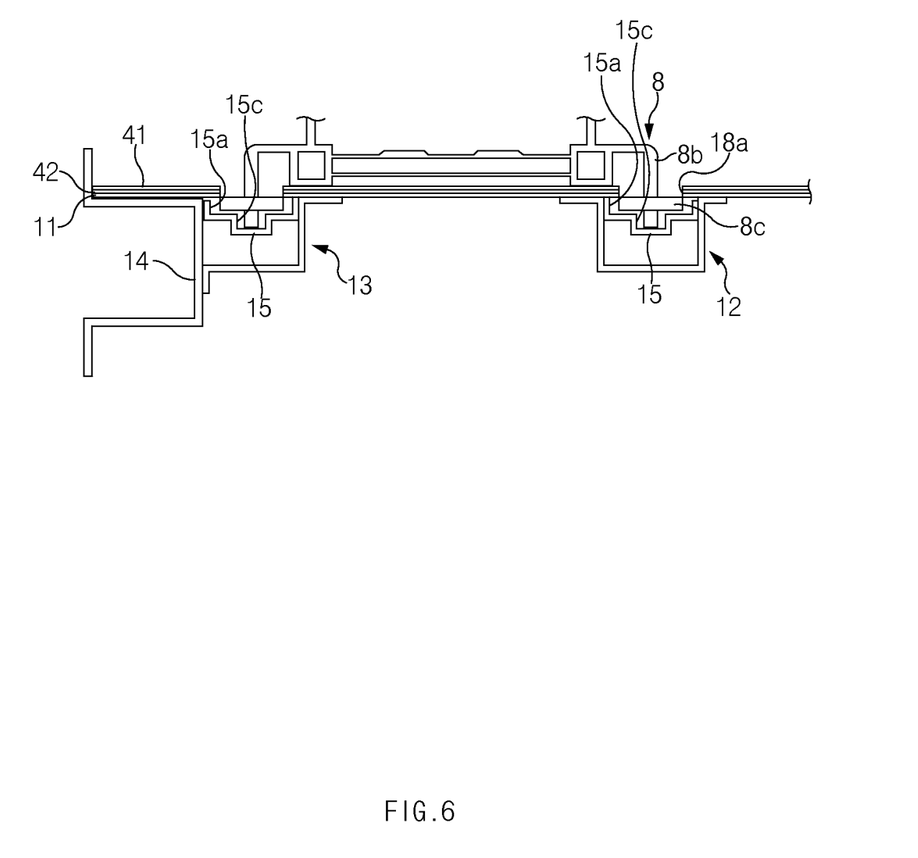
FIG. 6 illustrates a cross-sectional view taken along line C-C of FIG. 1.
Figure 7:
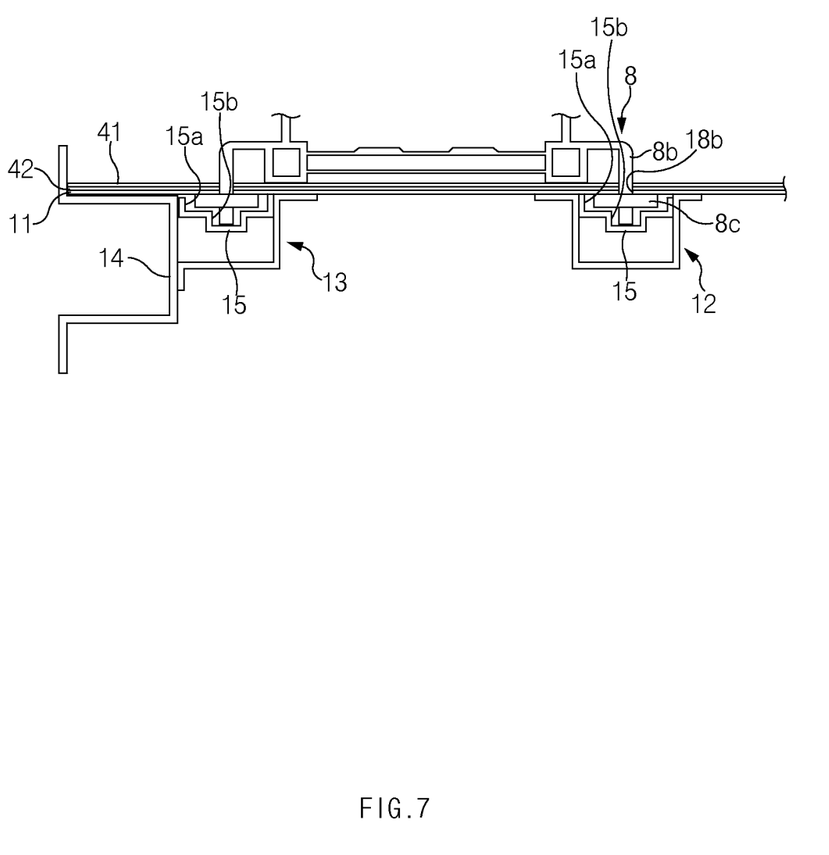
FIG. 7 illustrates a cross-sectional view taken along line D-D of FIG. 1.

Referring to FIGS. 3, 6, and 7, a pad 42 may be attached to a top surface of the center floor 11, and a carpet 41 may be attached to a top surface of the pad 42. That is, the pad 42 and the carpet 41 may be sequentially stacked on the center floor 11. The carpet 41 and the pad 42 may have openings corresponding to the first openings 18a and the second openings 18b of the center floor 11.

Figure 8:
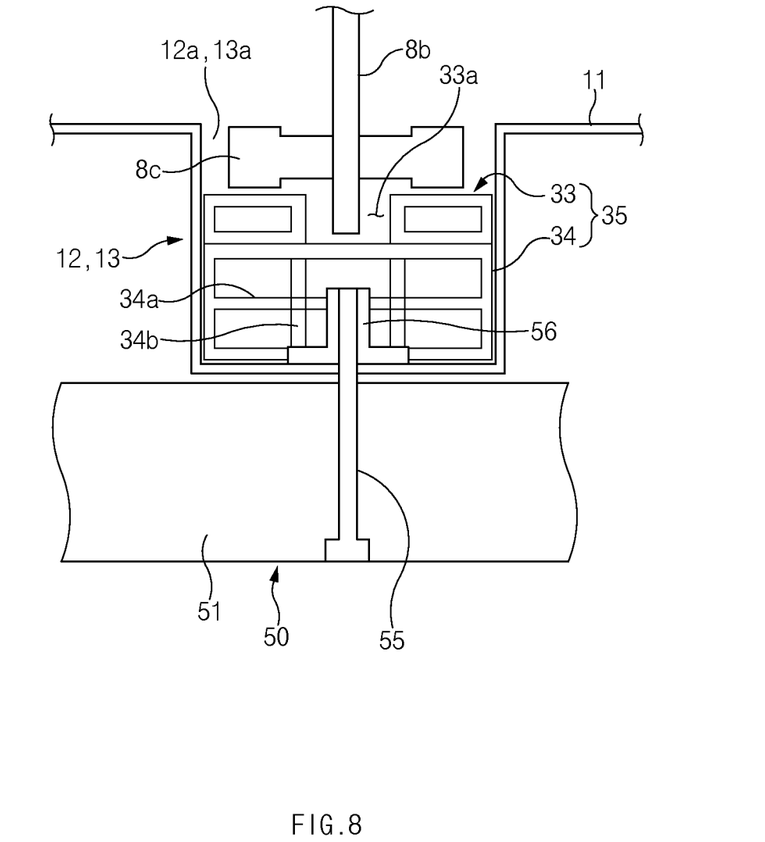
FIG. 8 illustrates a cross-sectional view of a portion of a vehicle floor structure according to another exemplary embodiment of the present disclosure.

Referring to FIG. 8, the vehicle floor structure 10 according to another exemplary embodiment of the present disclosure may include long seat rails 35, each of which has a guide portion 33 guiding the roller 8c of the vehicle seat assembly 8 and a reinforcing portion 34 integrally connected to the guide portion 33. For example, the long seat rail 35 may be an aluminum extruded product formed by extrusion molding, and thus the guide portion 33 and the reinforcing portion 34 may form a unitary one-piece structure.

The long seat rail 35 may extend in the longitudinal direction of the vehicle. The long seat rails 35 may be received in the corresponding cavities 12a and 13a of the longitudinal members 12 and 13, and the long seat rails 35 may be fixed to the inner surfaces of the corresponding longitudinal members 12 and 13 by welding, using fasteners, and/or the like.

The guide portion 33 may be provided in an upper portion of the long seat rail 35, and the guide portion 33 may extend in the longitudinal direction of the vehicle. The guide portion 33 may have a recess 33a in which the bottom end of the shaft 8d of the vehicle seat assembly 8 is received.

The reinforcing portion 34 may have a plurality of reinforcing ribs 34a and 34b, and the plurality of reinforcing ribs 34a and 34b may extend in vertical, horizontal, and inclined directions of the long seat rail 35. The reinforcing portion 34 may be located under the guide portion 33, and the nut 56 may be fixed to the reinforcing portion 34 by welding and/or the like.

As the through bolts 55 pass through the battery case 51, the longitudinal members 12 and 13, and the reinforcing portions 34, and the threaded portions of the through bolts 55 are screwed into the nuts 56, the battery case 51 may be mounted to the longitudinal members 12 and 13 and the long seat rails 35. The reinforcing portions 34 together with the through bolts 55 and the nuts 56 may form a mounting mechanism with respect to the battery assembly 50. In particular, as the reinforcing portions 34 support the nuts 56, the mount stiffness of the battery assembly 50 may be improved.

Figure 9:
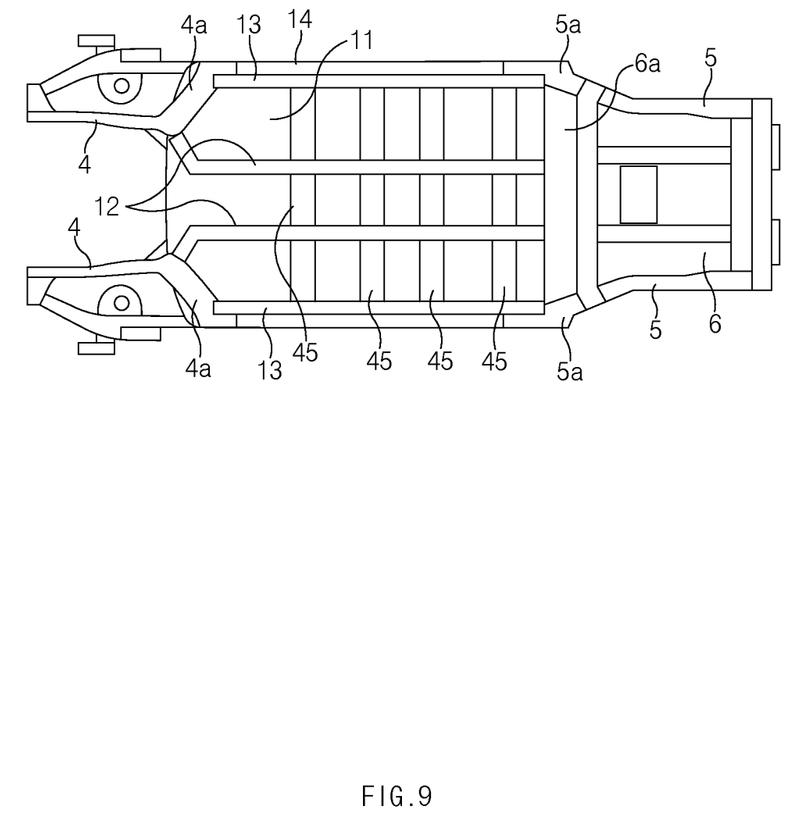
FIG. 9 illustrates a bottom view of a vehicle floor structure according to another exemplary embodiment of the present disclosure.

Referring to FIG. 9, the vehicle floor structure 10 according to an exemplary embodiment of the present disclosure may further include a plurality of crossmembers 45 perpendicular to the plurality of longitudinal members 12 and 13. Each crossmember 45 may be attached to the bottom surface of the center floor 11 by welding, using fasteners, and/or the like, and the plurality of crossmembers 45 may be connected to intersect with the plurality of longitudinal members 12 and 13. Each crossmember 45 may extend in the width direction of the vehicle, and the crossmember 45 may receive a seat rail (not shown) guiding the rollers 8c of the vehicle seat assembly 8 in the width direction of the vehicle. Thus, the vehicle seat assembly 8 may slide along the width direction of the vehicle through the plurality of crossmembers 45. According to the exemplary embodiment illustrated in FIG. 9, the vehicle seat assembly 8 may slide along the longitudinal direction of the vehicle through the plurality of longitudinal members 12 and 13, and may slide along the width direction of the vehicle through the plurality of crossmembers 45. The plurality of crossmembers 45 may be perpendicular to the plurality of longitudinal members 12 and 13, and thus the plurality of longitudinal members 12 and 13 may define load paths in the longitudinal direction of the vehicle, and the plurality of crossmembers 45 may define load paths in the width direction of the vehicle. Accordingly, impact energy may be distributed or absorbed in various directions in the event of front, rear, and/or side collisions of the vehicle.

As set forth above, the longitudinal members 12 and 13 with the long seat rails 15 received therein may be attached to the bottom surface of the center floor 11. Compared to the related art vehicle floor structure, the vehicle floor structure according to exemplary embodiments of the present disclosure may be capable of facilitating the loading and assembly of the long seat rails 15 and the vehicle seat assemblies 8, improving the mount stiffness of the battery assembly 50, securing enough space for a passenger compartment and a desired battery capacity, and improving the stiffness of the vehicle body.

According to exemplary embodiments of the present disclosure, as the plurality of longitudinal members 12 and 13 and the plurality of long seat rails 15 are attached to the bottom surface of the center floor 11, a flat floor may be obtained. The thickness of the carpet 41 and the thickness of the pad 42 may be reduced compared to the related art, resulting in significantly reduced cost.

According to the related art, a vehicle seat assembly is mounted on long seat rails after the long seat rails are mounted on a top surface of a center floor, and thus the assembly of the long seat rails and the vehicle seat assembly may be relatively difficult. On the other hand, according to exemplary embodiments of the present disclosure, the vehicle seat assembly 8 may be mounted on the long seat rails 15 after the longitudinal members 12 and 13 with the long seat rails 15 received therein are mounted on the center floor 11, and thus the assembly of the vehicle seat assembly 8 may be significantly simple and easy.

According to exemplary embodiments of the present disclosure, the widths of the openings 18a and 18b in the center floor 11 may be minimized, and thus the watertight and NVH performance of the center floor 11 may be improved.

According to exemplary embodiments of the present disclosure, the reinforcing members 16 or the reinforcing portions 34 capable of increasing fastening stiffness of the through bolts 55 passing through the battery case 51 may be fixed to the longitudinal members, thereby improving the mount stiffness of the battery assembly 50.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle floor structure, comprising:
   a center floor;
   a plurality of longitudinal members attached to a bottom surface of the center floor; and
   a battery assembly having a battery case disposed under the center floor and a through bolt passing through the battery case,
   wherein the through bolt is aligned with respect to at least one longitudinal member among the plurality of longitudinal members, and
   the through bolt is joined to the at least one longitudinal member.

2. The vehicle floor structure according to claim 1, wherein the plurality of longitudinal members include:
   two first longitudinal members facing each other in relation to a central longitudinal axis of the center floor; and
   two second longitudinal members disposed on both side edges of the center floor, respectively.

3. The vehicle floor structure according to claim 2, wherein each of the first longitudinal members includes a bottom wall having an inner side edge facing an interior of a vehicle and an outer side edge facing an exterior of the vehicle, an inner sidewall extending from the inner side edge of the bottom wall toward the center floor, an outer sidewall extending from the outer side edge of the bottom wall toward the center floor, an inner flange extending from a top end of the inner sidewall toward the interior of the vehicle, and an outer flange extending from a top end of the outer sidewall toward the exterior of the vehicle, and the inner flange and the outer flange are joined to the bottom surface of the center floor.

4. The vehicle floor structure according to claim 2, wherein front ends of the first longitudinal members are joined to front side members, rear ends of the first longitudinal members are joined to a rear floor, and the rear floor is disposed behind the center floor.

5. The vehicle floor structure according to claim 2, wherein a pair of side sills are attached to both side edges of the center floor, respectively, and the second longitudinal members are joined to the corresponding side sills, respectively.

6. The vehicle floor structure according to claim 2, wherein each of the second longitudinal members includes a bottom wall, an inner sidewall extending from an inner side edge of the bottom wall toward the center floor, an inner flange extending from a top end of the inner sidewall toward an interior of a vehicle, and an outer flange extending vertically from an outer side edge of the bottom wall toward the battery assembly, the inner flange is joined to the bottom surface of the center floor, and the outer flange is joined to a corresponding side sill.

7. The vehicle floor structure according to claim 2, wherein front ends of the second longitudinal members are joined to front side members, rear ends of the second longitudinal members are joined to rear side members, and the rear side members are disposed behind the center floor.

8. The vehicle floor structure according to claim 1, further comprising a plurality of long seat rails disposed in cavities of the plurality of longitudinal members, respectively, wherein the through bolt is vertically aligned with respect to the at least one longitudinal member among the plurality of longitudinal members and at least one long seat rail among the plurality of long seat rails.

9. The vehicle floor structure according to claim 8, wherein the long seat rail has a guide portion guiding a roller of a vehicle seat assembly.

10. The vehicle floor structure according to claim 8, further comprising a reinforcing member disposed in the cavities of the longitudinal members, wherein the reinforcing member is located under the long seat rail, a nut is fixed to the reinforcing member, and the through bolt is screwed into the nut.

11. The vehicle floor structure according to claim 8, wherein the long seat rail includes a guide portion guiding a roller of a vehicle seat assembly, and a reinforcing portion integrally connected to the guide portion, the reinforcing portion has a plurality of reinforcing ribs, a nut is fixed to the reinforcing portion, and the through bolt is screwed into the nut.

12. The vehicle floor structure according to claim 1, wherein the center floor has a first opening for mounting a roller of a vehicle seat assembly, and a second opening for guiding a movement of a seat support frame of the vehicle seat assembly, and a width of the second opening is less than a width of the first opening.

13. The vehicle floor structure according to claim 1, further comprising a plurality of crossmembers perpendicular to the plurality of longitudinal members, wherein the plurality of crossmembers guide a roller of a vehicle seat assembly in a width direction of a vehicle.

14. The vehicle floor structure according to claim 1, wherein the through bolt is vertically aligned with respect to the at least one longitudinal member among the plurality of longitudinal members and with respect to the center floor.

15. The vehicle floor structure according to claim 1, wherein the through bolt passes through the at least one longitudinal member.

\* \* \* \* \*